United States Patent [19]

Suga et al.

[11] Patent Number: 4,560,995

[45] Date of Patent: Dec. 24, 1985

[54] RECORDER WITH SELF LOADING FEED

[75] Inventors: Tateo Suga; Hiroshi Tamura; Masaaki Taguchi; Tokio Suzuki, all of Tokyo, Japan

[73] Assignee: Yokogawa Hokushin Electric Corporation, Tokyo, Japan

[21] Appl. No.: 635,652

[22] Filed: Jul. 30, 1984

[30] Foreign Application Priority Data

| Sep. 1, 1983 | [JP] | Japan | 83-135566 |
| Sep. 7, 1983 | [JP] | Japan | 83-138851 |
| Sep. 12, 1983 | [JP] | Japan | 83-141270 |
| Sep. 14, 1983 | [JP] | Japan | 83-141482 |
| Sep. 20, 1983 | [JP] | Japan | 83-14504 |

[51] Int. Cl.$^4$ ............................................. G01D 15/24
[52] U.S. Cl. ....................................... 346/136; 226/91
[58] Field of Search .................. 346/136, 145; 226/91, 226/92, 93

[56] References Cited

U.S. PATENT DOCUMENTS 4,127,858 11/1978 Schiller .............................. 346/136
4,348,118 9/1982 Skafvenstedt ...................... 346/136

Primary Examiner—E. A. Goldberg
Assistant Examiner—Mark Reinhart
Attorney, Agent, or Firm—Moonray Kojima

[57] ABSTRACT

A recorder has a chart feed mechanism for automatically loading a chart for recording operation. By loading a chart stock storing a chart into a recorder case, discharge roller and feed roller of a chart feed means are actuated to feed the chart into a condition in which data can be recorded thereon.

8 Claims, 17 Drawing Figures

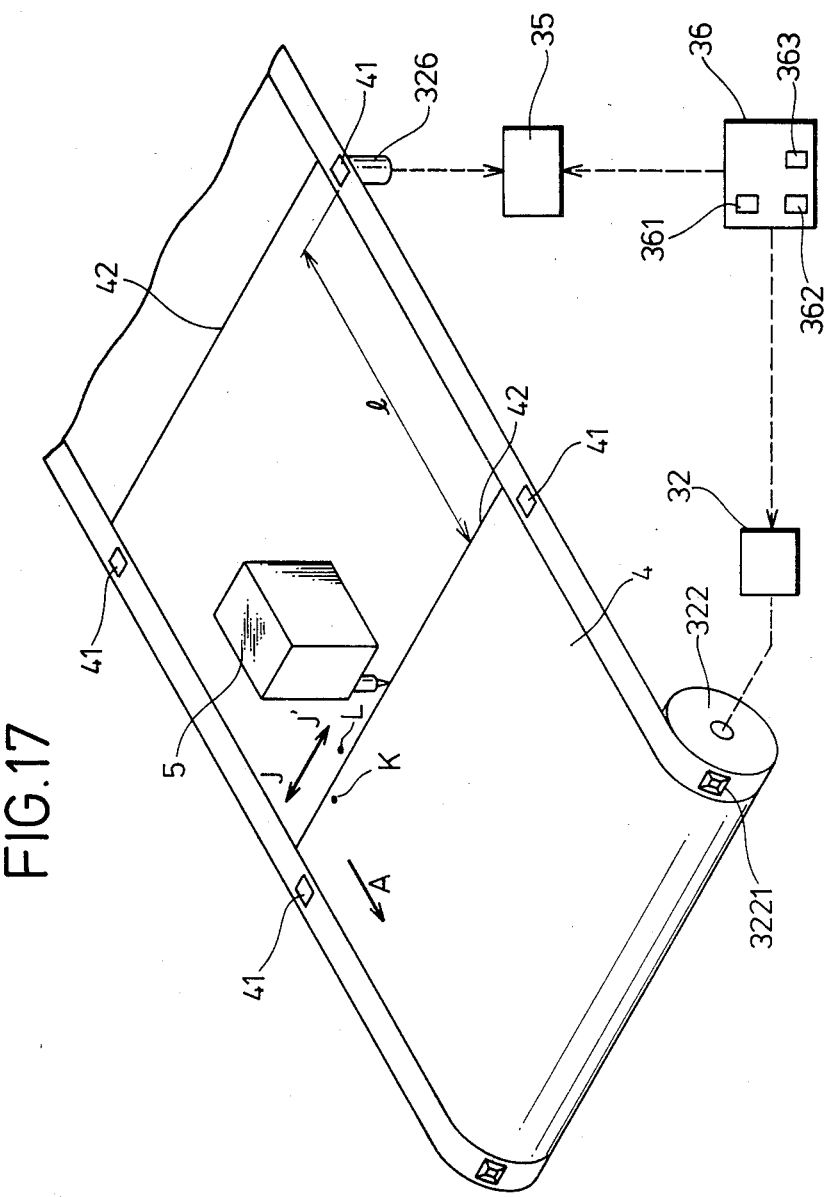

RECORDER WITH SELF LOADING FEED

BACKGROUND OF THE INVENTION

1. Field of the Invention

This invention relates to a recorder having a chart, a chart feed mechanism for feeding the chart, and a recording head movable perpendicularly to a direction in which the chart is fed for recording data on the chart.

2. Description of the Prior Art

One known example of the above described recorder is disclosed in U.S. Pat. No. 4,091,389. In this recorder, to load a chart in a chart feed mechanism, it is necessary to manually pick up a chart from a chart stock, direct the chart along the chart feed mechanism, and then pull the chart until it reaches a feed roller in the chart feed mechanism. This procedure is cumbersome and time consuming. Also, disadvantageously, after the chart has been loaded on the feed roller, the chart has to be tensioned by driving the recorder for a while to see if the chart will be fed completely. Such a process is time consuming and requires added operator attention.

SUMMARY OF THE INVENTION

Accordingly, an object of the invention is to overcome the aforementioned and other deficiencies and disadvantages of the prior art.

Another object is to provide a recorder which is capable of automatically loading a chart therein, and which eliminates manuel loading procedures.

According to the invention, there is provided a recorder comprising a case, a chart feed mechanism mounted in the case for feeding in incremental steps a chart having substantially equally spaced holes defined in at least one longitudinal edge thereof, and a recording head mounted in the case and movable in a direction substantially perpendicular to the direction of travel of the chart for recording data on the chart.

The chart feed mechanism comprises a chart stock disposed in the case for storing the chart therein, the stock having a chart outlet; chart feed means having a discharge roller for discharging the chart from the chart from the chart stock; first presser means for pressing the chart against the discharge roller; a feed roller for feeding the discharge chart; second presser means for urging the chart against the feed roller; a first sensor mechanism disposed in the case in confronting relation to the chart outlet for detecting whether the chart is in the outlet and for issuing a drive signal to the chart feed means when the chart is in the outlet; and a second sensor mechanism disposed in the case in confronting relation to the chart and positioned in a path of travel of the chart between the discharge roller and the feed roller, the second sensor mechanism being arranged to detect whether the chart is in the path a fixed period of time after the chart feed means has started being driven by the drive signal from the first sensor mechanism, to keep the chart feed means driven for a certain period of time when the chart is in the path, and to issue a signal to inactivate the chart feed means when the chart is not present in the path.

BRIEF DESCRIPTION OF DRAWINGS

FIG. 17 is a perspective view depicting a still further illustrative embodiment.

DESCRIPTION OF THE PREFERRED EMBODIMENTS

Figure 1:
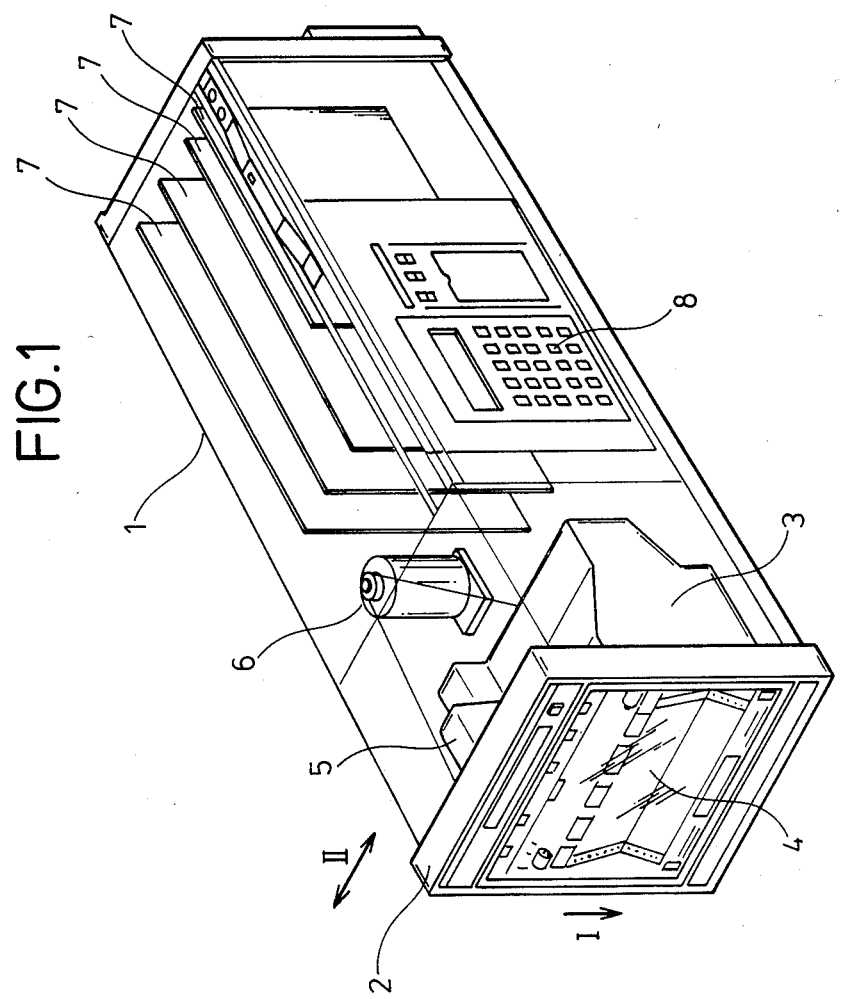
FIG. 1 is a schematic perspective view depicting an illustrative embodiment of the invention.

Turning now to FIG. 1, there is depicted a recorder comprising a case 1, in the form of a rectangular parallelepiped with a front cover 2 attached thereto; a chart drive mechanism 3 mounted in case 1 for feeding a chart 4 in the direction of arrow I; recording head 5 movable in the direction of arrow II perpendicular to the direction of arrow I for recording data on chart 4; a drive motor 6 for driving head 5; and amplifier 7 which receives input signals and supplies drive signals to motor 6 to drive head 5. Operating conditions of the recorder are set by a tuning card 8.

Figure 2:
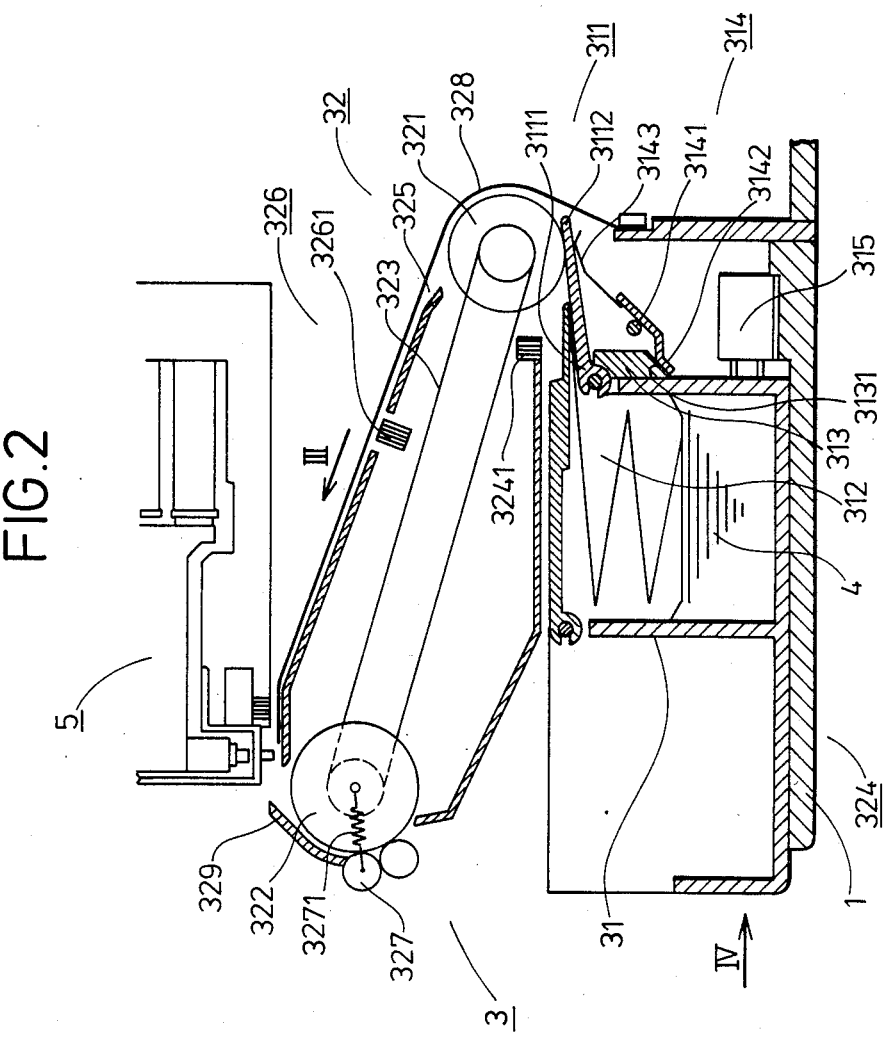
FIG. 2 is a sectional side elevational view depicting a chart feed section of the embodiment of FIG. 1.

FIG. 2 illustrates in detail a chart feed section of the embodiment of FIG. 1, comprising case 1, chart drive mechanism 3, chart 4 and recording head 5. Chart drive mechanism 3 has has a chart stock 31 and a chart feed means 32. Chart stock 31 is mounted in case 1 and accommodates a fanfold chart 4. Chart stock 31 is made of a magnetic material such as iron.

Chart feed means 32 comprises a discharge roller 321, a feed roller 322, and a toothed belt 323 trained therearound for feeding chart 4 in the direction of arrow III. Discharge roller 321 discharges chart 4 from chart stock 31, and feed roller 322 feeds chart 4, as discharged by discharge roller 321, into another compartment of chart stock 31, as depicted. Toothed belt 323 rotates discharge roller 321 and feed roller 322 in ganged relation. Feed roller 322 is of a diameter which is larger than that of discharge roller 321. A guide plate 311 has one end 3111 angularly movably disposed in a chart outlet 312 and an oppoiste end 3112 held against discharge roller 321 with chart 4 disposed therebetween. A pusher block 313 is mounted on chart stock 31 near chart outlet 312 and has a slanted surface 3131 extending obliquely upwardly to the right as depicted. A leaf spring 314 has an intermediate portion 3141 angularly movably supported on case 1, one end 3142 pressed against pusher block 313, and an opposite end 3143 presed against end 3112 of guide plate 311. A magnet 315 is mounted in case 1 to magnetically attract chart stock 31 to case 1.

A first sensor mechanism 324 is disposed in chart drive mechanism 3 in contronting relation to chart outlet 312 for detecting whether or not there is a chart 4 present in the chart stock 31. If there is a chart present, first sensor mechanism 324 issues a drive signal to chart feed means 32. First sensor mechanism 324 comprises a sensor 3241 and an electric circuit (not shown). Sensor 3241 comprises a reflective optical switch.

Designated at 325 is a path of travel of chart 4. A second sensor mechanism 326 is disposed in path 325 in confronting relation to chart 4. Second sensor mechanism 326 detects whether or not there is present at the sensor location a chart 4 for a fixed period of time after chart feed means 32 has started being driven by a drive signal from first sensor mechanism 324. If there is a chart present, second sensor mechanism 326 keeps chart feed means 32 driven for a certain period of time. If there is no chart 4 present, second sensor mechanism 326 immediately issues a signal to stop chart feed means 32. Second sensor mechanism 326 comprises a sensor 3261 comprising a reflective optical switch and an electric circuit (not shown).

A presser roller 327 is pressed against feed roller 322 under resilient force of spring 3271. Guide plate 311 is pressed against discharge roller 321 to produce a frictional force $F_1$ which acts on chart 4. Presser roller 327 is pressed against feed roller 322 to produce a frictional force $F_2$ which acts on chart 4. Frictional force $F_1$ is preferably greater than frictional force $F_2$. A top plate 328 is mounted on case 1 in convering relation to discharge roller 321 and path 325, as depicted. A receiver plate 329 is mounted on case 1 in covering relation to feed roller 322, as depicted.

Figure 3:
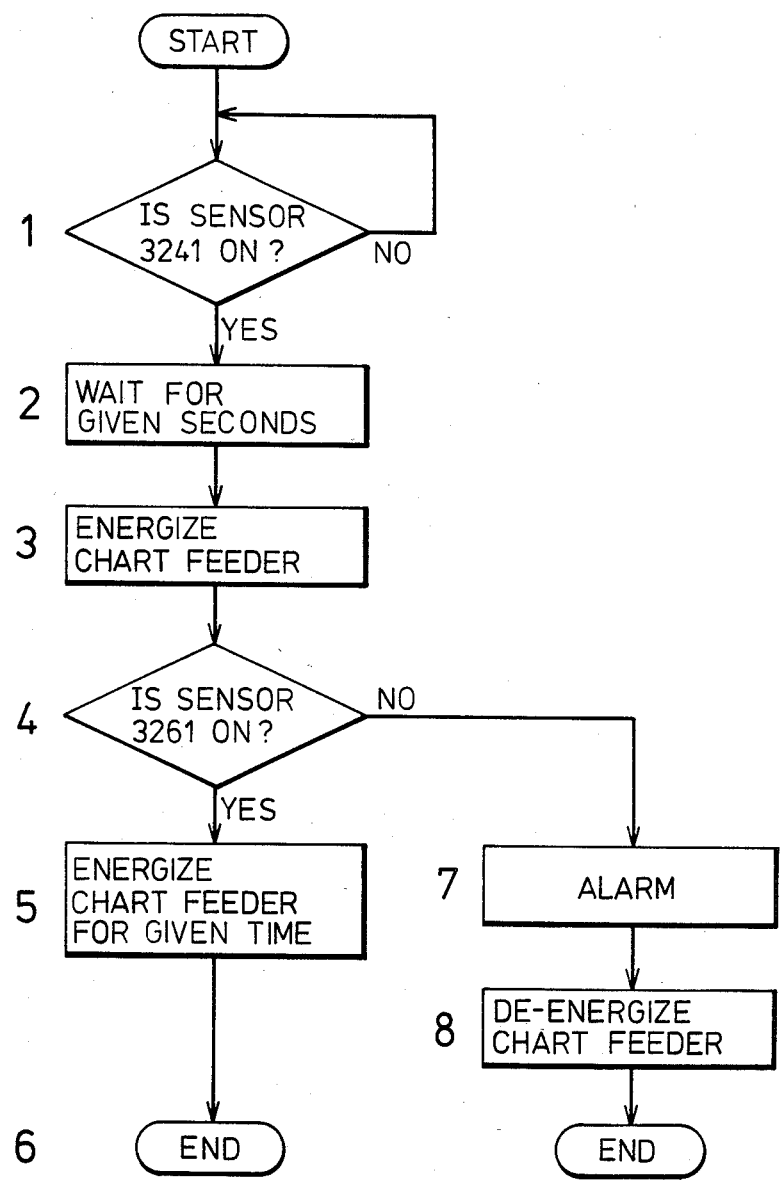
FIG. 3 is a flow chart depicting operation of the chart feed section shown in FIG. 2.

Operation of the recorder thus far described will now be described with reference to the flow chart of FIG. 3.

After "START", in Step 1, when chart 4 is detected by sensor 3241, sensor 3241 is energized. Thus, sensor 3241 remains de-energized before chart 4 is detected thereby. Thus, sensor 3241 is not energized if there is no chart 4 present in chart stock 31. A determination is made whether sensor 3241 is ON or OFF. If sensor 3241 is OFF (i.e. NO), the step is repeated. If the sensor 3241 is ON (i.e. YES) we proceed to Step 2.

In Step 2, a few seconds after sensor 3241 has been turned ON, first sensor mechanism 324 applies a drive signal to chart feed means 32. The drive signal is applied to chart feed means 32 with a time delay in order to wait for chart stock 31 to be completely loaded in case 1. Such a time delay is not necessary, and the step can proceed without such delay.

In Step 3, chart feed means 32 is drive to start loading chart 4.

Next, in Step 4, a determination is made whether sensor 3261 is ON or OFF. A given time period after chart feed means 32 has started to be driven by drive signal from first sensor mechanism 324 (that is, a period of time required for chart 4 to reach sensor 3261), the sensor 3261 detects whether or not chart 4 is present in the flow path.

If there is present chart 4 (i.e. YES) then in STEP 5, chart feed means 32 is driven for a certain period of time and then the procedure is ended (Step 6).

If there is no chart 4 present (i.e. NO), then in STEP 7 an alarm is issued by an alarm means. The alarm means may, however, be dispensed with.

Then, in Step 8, chart feed means 32 is stopped, and the procedure is ended.

In carrying out the foregoing steps, the chart 4 is thus automatically loaded. Advantageously, no manual procedure is required and errors which are inherently caused by human errors are avoided and efficiency is increased.

In the above embodiment, chart 4 is pressed against discharge roller 321 by leaf spring 314 and guide plate 311. However, the invention is not limited to such an arrangement. Other mechanisms may be used to press chart 4 against discharge roller 321. For example, a pressing roller and spring may be used for pressing chart 4 against discharge roller 321.

As described above, the chart can be automatically loaded by placing the chart stock in the case and monitoring the chart as it is discharged from the chart stock using the first and second sensor mechanisms to turn ON and OFF the chart feed means. Consequently, the chart can be loaded automatically rather than requiring manual loading. According to the invention, therefore, there is provided a chart feed mechanism capable of automatically loading a chart.

A mechanism will now be described which can eliminate the folding tendency of the chart and thereby prevent a recording pen from being caught by the chart, improve recorded data and tracing quality, and feed the chart without failures.

Figure 4:
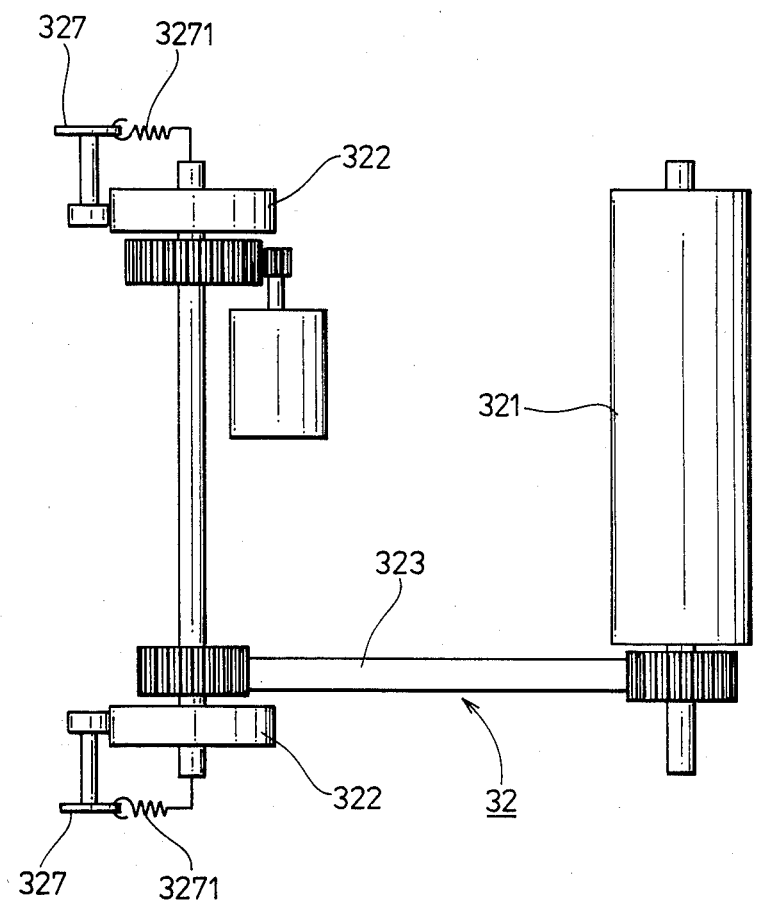
FIG. 4 is a plan view depicting a chart feed means of the chart feed section shown in FIG. 2.

FIG. 4 depicts a plan view of an arrangement corresponding to a portion of the chart feed section shown in FIG. 2. When toothed belt 323 is driven, chart 4 is fed along at a rate proportional to the number of r.p.m. of feed rollers 322 and tensioned between discharge roller 321 and feed roller 322. In the arrangment of FIG. 4, frictional force $F_2$ (i.e. the force on feed roller 322) is selected to be greater than the frictional force $F_1$ (i.e. the force on discharge roller 321) so that chart 4 tends to slip on discharge roller 321. Thus, chart 4 is fed along at a rate determined by action of feed roller 322 while being tensioned at all times between discharge roller 321 and feed roller 322.

Data will be recorded on chart 4 which is thus tensioned. Any folding tendency of the chart 4 and tendency of the chart 4 to be raised around the fold of the chart can therefore be eliminated. Thus, recorded data and tracing quality, is improved. The chart, advantageously, can be fed without failures due to such folding and rising tendencies.

Although frictional force $F_2$ has been described to be greater than frictional force $F_1$, in other cases, frictional force $F_1$ may be greater than frictional force $F_2$. With such alternative, the rate of feed of chart 4 is then determined by action of discharge roller 321.

In the FIG. 4 embodiment, feed rollers 322 are larger in diameter than the diameter of discharge roller 321, and the feed rollers and discharge roller rotate at the same rotational speed. However, the invention is not limited to such an arrangement, but may be modified. As an example, feed rollers 322 may be of the same diameter as that of discharge roller 321, and feed rollers 322 may rotate at a speed higher than the speed of rotation of discharge roller 321. The preferred condition is that the rate of feed of chart 4 determined by feed roller 322 be greater than that determined by discharge roller 321.

According to the embodiment of FIG. 4, the rate of feed of the fanfold chart given by the feed roller is higher than that given by the discharge roller, and the frictional forces imposed on the chart by the feed roller and discharge roller are different from each other. Thus, the chart is always under tension between the discharge roller and feed roller and any adverse influence due to the folding tendency of the chart is eliminated. With the embodiment of FIG. 4, therefore, there is provided a chart feed mechanism capable of eliminating folding tendency of the chart. Thus, advantageously, the recording pen will not be caught by any folding of the chart, and recording data and tracing quality will be improved, and the chart feeding is improved in reliability.

Turning now to FIGS. 5,6,7,8, a mechanism will be described which prevents the leading edge 141 of chart 4 from being pushed back and allows chart 4 to be reliably grasped by the chart feed means when chart stock 31 is put into case 1.

Figure 5:
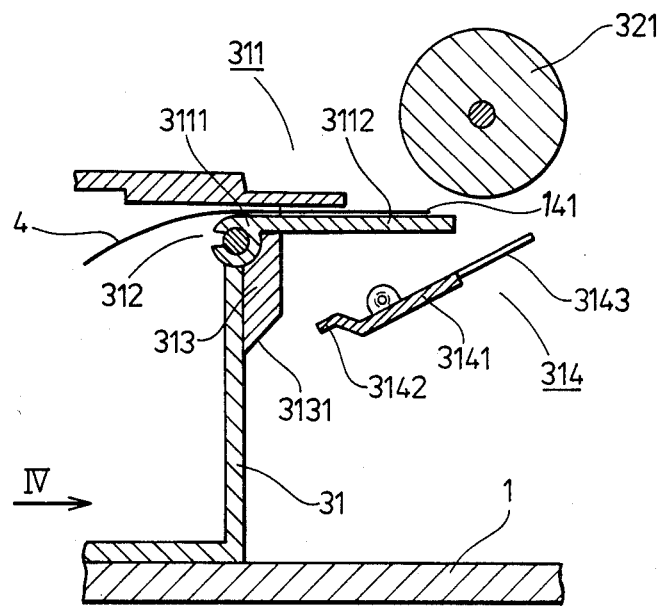
FIGS. 5,6,7 are cross sectional views depicting the manner in which a chart is loaded into a chart stock.
Figure 6:
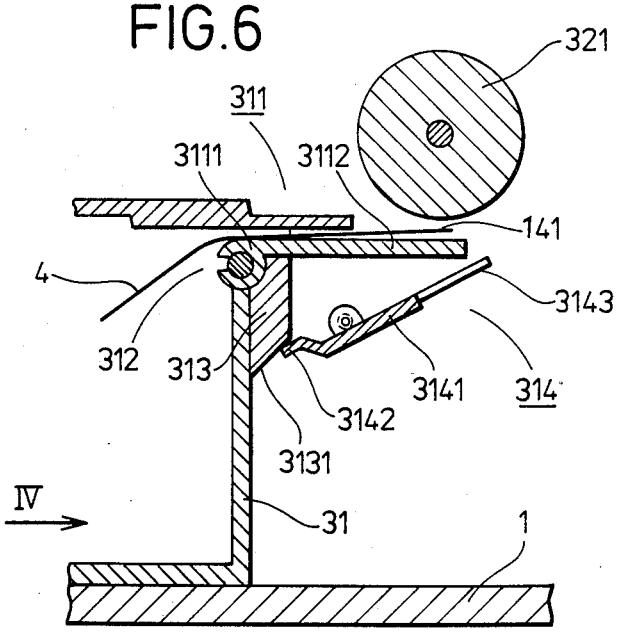

Chart stock 31 is loaded into case 1 in the direction of arrow IV as shown in FIG. 2. At this time, chart stock 31 is not yet in contact with leaf spring 314 as shown in FIG. 5. Spring leaf 314 is connected to case 1 and chart stock 31 is inserted from the left to right into case 1, in such a manner as shown step by step in FIGS. 6, then FIG. 7. As shown in FIG. 6, as chart stock 31 is pushed further in the direction of arrow IV. End 3142 of leaf spring 314 is pushed counterclockwise by the slanted surface 3131 of pusher block 313.

Figure 7:
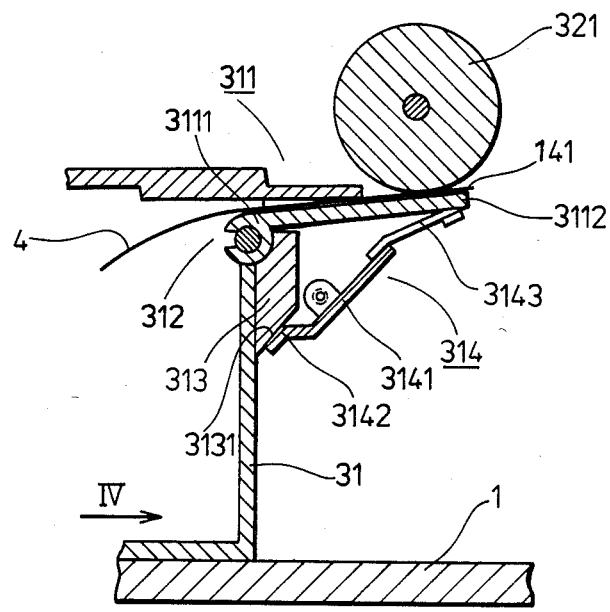

Next, as shown in FIG. 7, when chart stock 31 is pushed into an operational position into case 1, end 3143 of leaf spring 314 presses end 3112 of guide plate 311 counterclockwise, which then presses chart 4 against discharge roller 321. As a consequence, leading end 141 of chart 4 is reliably grasped and will not be pushed back into chart stock 31. The above arrangement is suitable for use in a chart feed mechanism for automatically loading a chart.

Figure 8:
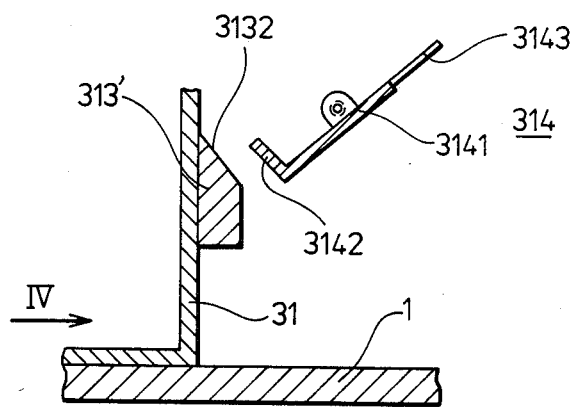
FIG. 8 is a cross sectional view depicting a modified pusher block.

While in the above arrangement pusher block 313 has a slanted surface 3131 extending obliquely upwardly to the right, as shown in FIG. 8, a pusher block 313' may be used which has a slanted surface 3132 extending obliquely downwardly to the right. The pusher block may be made of any suitable material, such as a metal sheet bent to contour, molded plastic, etc, provided the block can press leaf spring 314 counterclockwise as chart stock 31 is pushed in direction of arrow IV.

The leaf spring in the case is turned counterclockwise as the chart stock is loaded into the case, thereby pushing up the end of the guide plate to press the leading edge of the chart against the discharge roller. Therefore, there is provided a chart feed mechanism which can, advantageously, prevent the leading end of the chart from returning to the chart stock, and also enable the leading end of the chart to be grasped reliably by the chart feed means.

A mechanism will now be described which allows easy attachment and removal of the chart stock and reduces the number of parts used and hence the cost. When chart stock 31 is to be loaded into case 1, chart stock 31 is pushed into case 1 until it is magnetically attracted by magnet 315 (see FIG. 2), whereupon chart stock 31 is retained in case 1. For removing chart stock 31 from case 1, chart stock 31 is pulled out of case 1 against the attractive force of magnet 315 on chart stock 31.

As a result, chart stock 31 can be removed simply by pulling manually the charts stock 31 from case 1, and the chart stock 31 can be simply loaded by merely pushing the chart stock 31 into the case 1. Attachment and removal of chart stock 31 is thus easy to effect. The arrangement for allowing such easy attachment and removal comprises only magnet 315, and hence is inexpensive.

Although chart stock 31 is made of a magnetic material, it may be made partially of a magnetic material. For example, an iron plate may be embedded in a chart stock body molded of plastic.

As described above, advantageously, there is provided a chart feed mechanism which allows the chart stock to be easily loaded and removed, which reduces the number of parts used, and which is economical and inexpensive.

Figure 9:
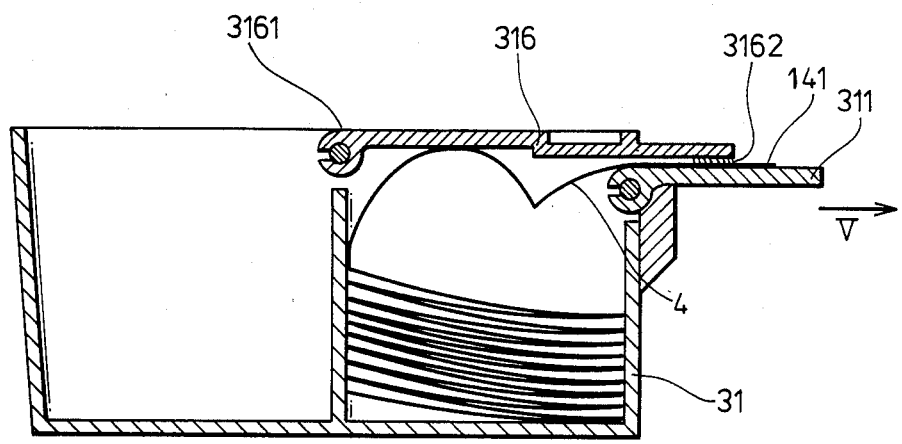
FIG. 9 is a cross sectional view depicting the chart stock.
Figure 10:
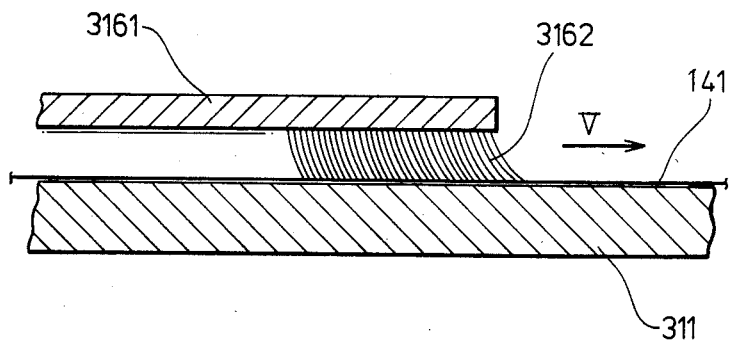
FIG. 10 is a cross sectional view depicting a portion of the chart stock.

FIG. 9 shows the chart stock 31 in greater detail. FIG. 10 shows a portion of the chart stock 31 in enlarged detail. Identical or corresponding parts in these figures are denoted by identical or corresponding reference numbers in FIGS. 1 and 2. Only those portions which have not been described with reference to FIGS. 1 and 2 will be described. A cover 316 has one end 3161 angularly movably supported on chart stock 31. A brush 3162 is fixed to an opposite end of cover 316 and cooperates with guide plate 311 in grasping and holding a portion of chart 4 near the leading edge 141 thereof. Brush 3162 serves to feed chart 4 only in the direction of feed as indicated by arrow V. Brush 3162 may comprise a brush manufacted and sold under the tradename "Etiquette Brush" by Japan Seal Co, or any similar brush.

Operation of chart stock 31, shown in FIGS. 9,10, is as follows. When chart stock 31 is loaded in case 1, the leading edge 141 of chart 4 may not be properly sandwitched between guide plate 311 and discharge roller 321. Even if this happens, due to action of brush 3162, leading edge 141 will not return into chart stock 31, but will be reliably discharged as discharge roller 321 rotates. This arrangement is particularly suitable for use in a chart feed mechanism for automatically loading the chart 4.

With the arrangement depicted in FIGS. 9,10, the brush for feeding the chart only in the direction of feed is disposed in the outlet of the chart stock so that the leading edge of the chart will be prevented from returning and will be reliably grasped by the chart feed means. Thus, advantageously, there is provided a chart feed mechanism for preventing the leading edge of the chart from returning and for allowing the leading edge of the chart to be grasped reliably by chart feed means.

Figure 11:
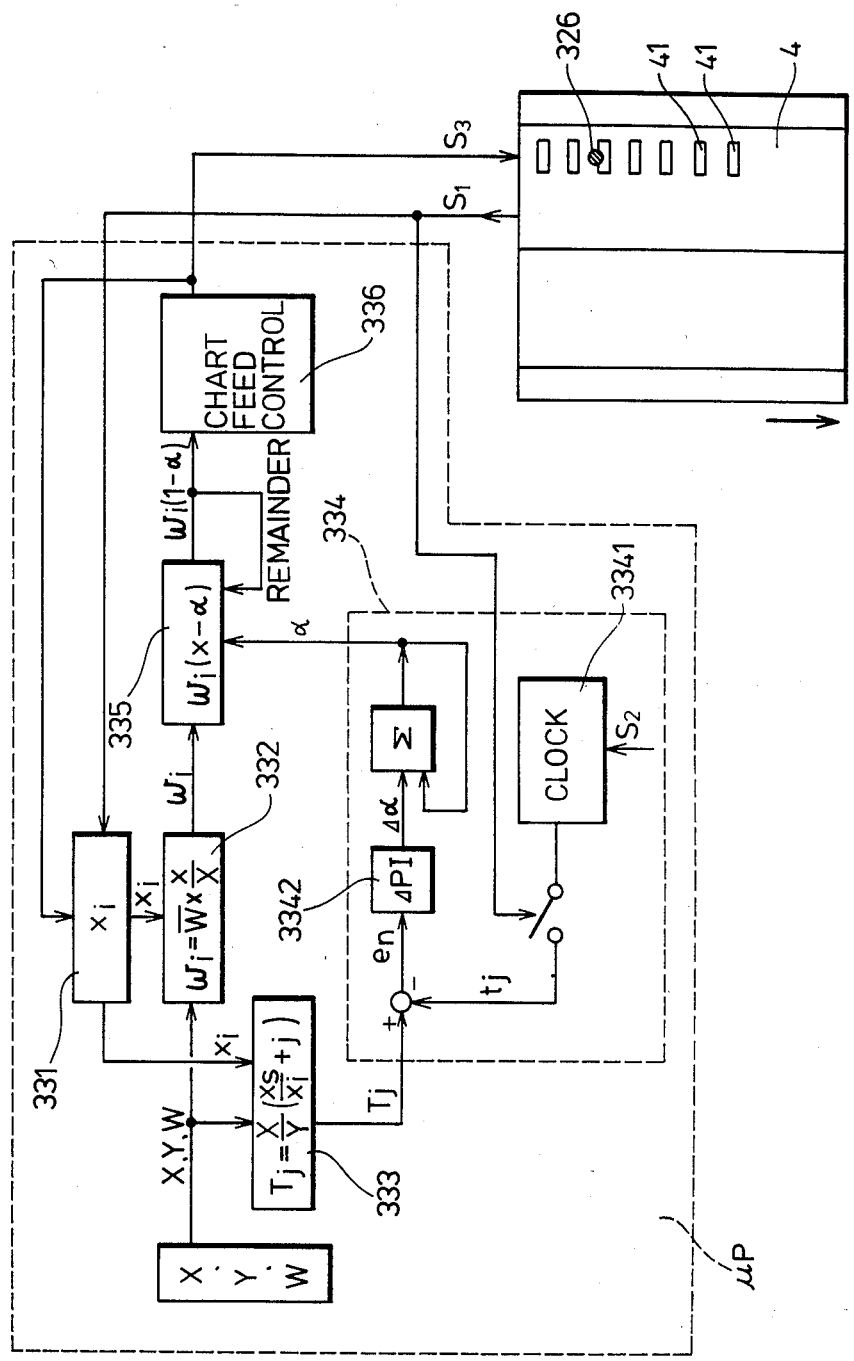
FIG. 11 is a block diagram depicting another illustrative embodiment of the invention.

FIG. 11 is a block diagram of a recorder according to another embodiment of the invention. The recorder is designed to prevent a varied rate of feed due to accumulated errors of the feed rate of the chart. Identical or corresponding parts in FIG. 11 are denoted by identical or corresponding numbers in FIGS. 1,2. Those portions which are different from those in FIGS. 1,2 will be mainly described.

Chart 4 has holes 41 defined in and along a longitudinal edge thereof and spaced at substantially equal intervals. Chart 4 is fed along in increments by a chart feed means having feed rollers (not shown). The chart feed means has a second sensor mechanism 326 disposed in confronting relation to the holes 41 for issuing an electric signal $S_1$ which is ON and OFF in respose to the presence and absence of holes 41. Second sensor mechanism 326 comprises a reflective photointerrupter. A counter means 331 is responsive to an output signal from second sensor mechanism 326 and counts the number $X_i$ of increments of feed by the chart feed means between hole ends. More specifically, counter means 331 is incremented each time chart 4 is fed by one step, and cleared each time an end of hole 41 is detected. A feed interval calculating means 332 calculates a feed interval Wi corresponding to an interval between recorded dots based on the number Xi of feed increments. A time calculating means 333 calculates the time $T_j$ in which the end of each hole 41 passes, based on the number Xi of feed increments. A control unit 334 serves to compare the time $T_j$ as calculated by the time calculating means 333 and a time $t_j$ based on a clock 3341 starting when chart 4 starts being fed, that is, when a signal $S_2$ is applied, and to effect a PI control mode in a PI controller 3342 so that the difference between the compared times will be eliminated. A correcting means 335 corrects an output from feed interval calculating means 332 with an ouput $\alpha$ from control unit 334. A chart feed control 336 issues a drive signal $S_3$ to drive the chart feed means (not shown) in an interval corresponding to the number of steps indicated by an output from correcting means 335.

Operation of the chart feed mechanism of FIG. 11 will now be described. Chart 4 is fed along one step at a time (one step being a minimum resolution of feed interval). Each time chart 4 is fed by one step, the signal from second sensor mechanism 326 checks to see whether the end of a hole 41 has passed, so that the distance between the ends of adjacent holes 41 can be measured as the number of steps or increments of feed of chart 4. The number of steps is denoted as Xi and counted by the counter means 331. The number of feed steps Xi is renewed each time the end of hole 41 has moved past sensor 326.

One feed interval Wi (expressed by the number of steps) for obtaining an interval W mm between recorded dots is calculated by feed interval calculating means 332 and expressed by the following equation:

$$Wi = W \times (xi/X) \text{ (steps)}$$

wherein X is the standard value of an inter-hole interval. The feed interval Wi is determined down to places of decimals, and any remainder is added to a next feed interval so that the feed interval can accurately be determined.

Since the feed interval xi itself has an error smaller than one step and is variable, and there is a limitation on the number of bits even if the feed interval is determined down to decimal places, the determined feed interval is subject to error.

Thus, feed interval errors will be accumulated and can become large when chart 4 is fed along for a long period of time. To avoid this, that is, to eliminate the accumulated error by way of feedback, the feed interval Wi is controlled by the addition of a coefficient $\alpha$ through the calculation of Wi(1-$\alpha$).

Figure 12:
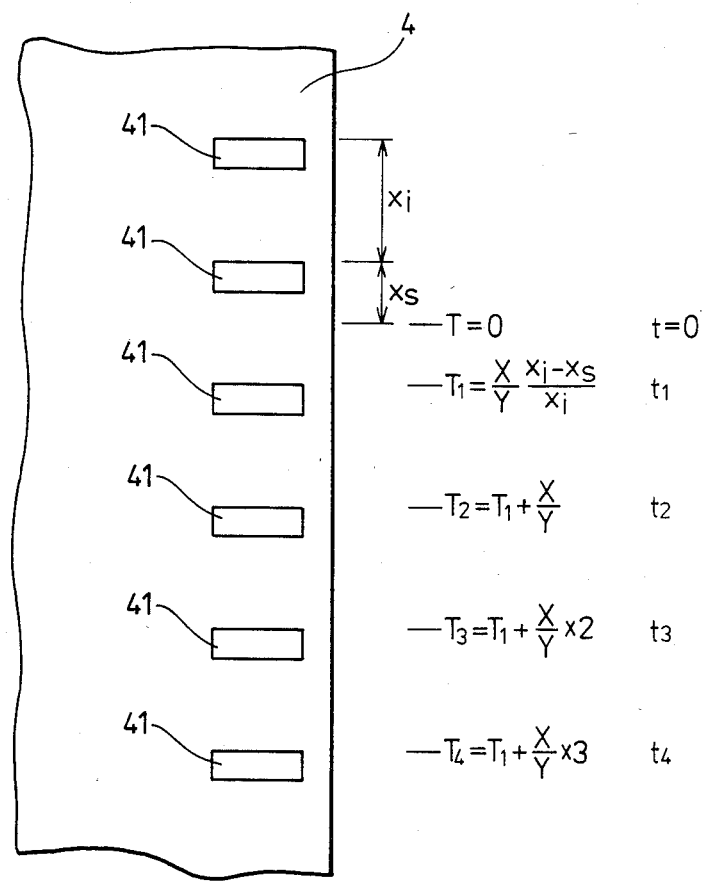
FIG. 12 is a diagram depicting operation of the embodiment of FIG. 11.

It is assumed that chart 4 starts to be fed at the position in which time T = 0. With the chart feed speed set to Y mm/s., a set time in which the chart is fed by the distance between adjacent holes is determined by X/Y (sec). Therefore, times in which the ends of the holes 41 move past the sensor 326 are determined successively as $T_1, T_2, T_3, \ldots, T_j$, as shown in FIG. 12. The time $T_j$ is calculated by time calculating means 333 by the following equation:

$$T_j = \frac{X}{Y}\left(\frac{Xi - Xs}{Xi} + j\right)$$

wherein Xs is the number of steps from the end of a hole 41 to the position whereat chart 4 starts to be fed along.

Let real times at which the ends of the holes 41 pass be indicated as times $t_1, t_2, t_3, \ldots, t_j$ by clock 3341 which has started at time T=0, and the difference $T_j - t_j$ is subjected to PI control so that it will be eliminated, and a corrective coefficient $\alpha$ is applied to correcting means 335. Correcting means 335 effects a calculation expressed by Wi(1 -$\alpha$). Chart feed control 336 drives the chart feed means with a drive signal $S_3$ dependent on the number of steps indicated by correcting means 335.

Since the number xi of steps is variable in reality, the varied numbers are filtered to produce an average value which will be used for feed control.

As a result of the foregoing corrective control, no feed interval errors will be accumulated even when the chart is fed frictionally. Therefore, data and times can be recorded in proper positions on chart 4. Even when the chart is elongated or contracted due to humidity or the like, the chart feed interval is automatically corrected to feed the chart by a proper interval.

While in the above embodiment the sensor for detecting the hole 41 comprises a photosensor, other sensor arrangements may be used provided they can detect the holes 41. For example, the sensor may comprise a sensor with electric contacts.

Counter means 331, feed interval calculating means 332, time calculating means 333, control unit 334, and correcting means 335 may be in the form of a microprocessor.

Advantageously, with the above arrangement, the sensor is positioned in confronting relation to the holes defined in the chart, and the number of steps of feed of the chart between the ends of adjacent holes is counted to determine a standard value of one feed interval from set parameters. When the chart starts being fed along, the times at which the hole ends move past the sensor are calculated from the set parameters. The calculated times are compared with times as counted by the clock which has started simultaneously with the starting of the chart, and the feed interval is corrected by PI control which is effected so that the difference between the compared times will be eliminated.

As a consequence, advantageously, there is provided a recorder in which the chart feed interval will not be varied due to accumulated errors.

Figure 13:
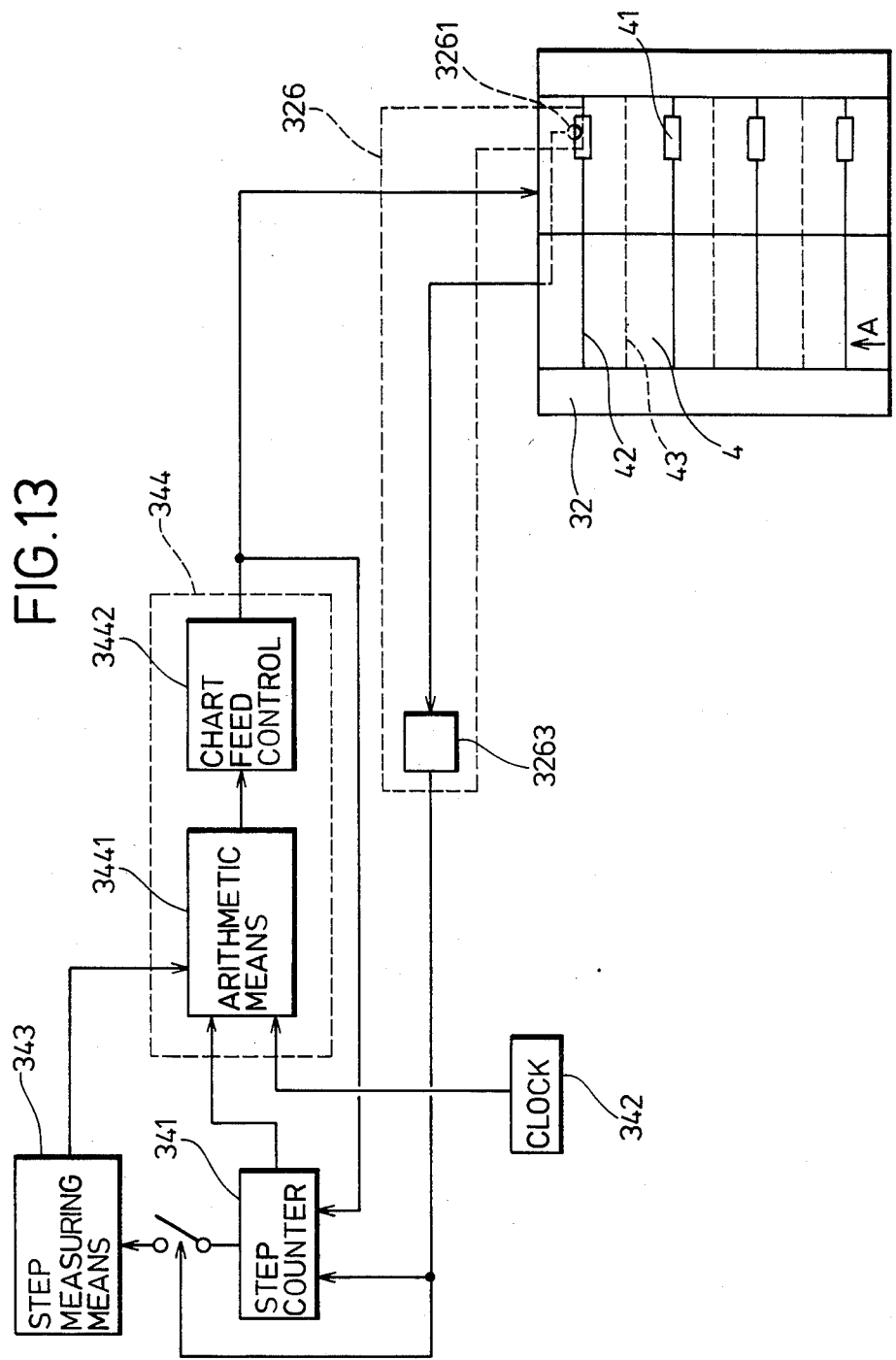
FIG. 13 is a block diagram depicting still another illustrative embodiment of the invention.
Figure 14:
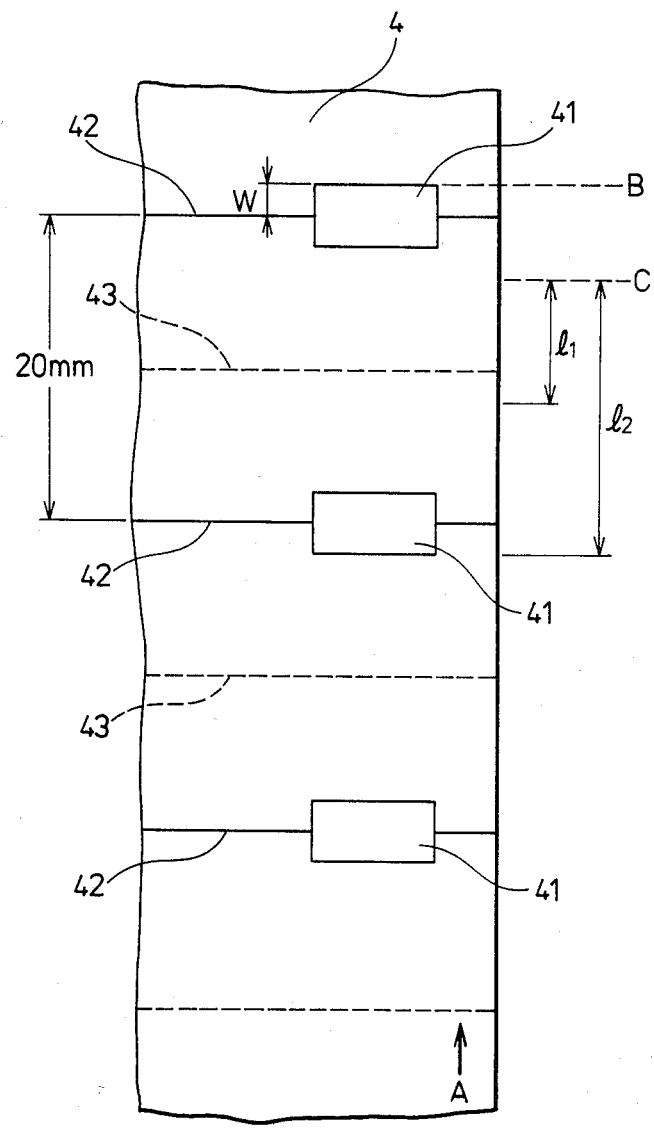
FIG. 14 is a diagram depicting operation of the embodiment of FIG. 13.

FIG. 13 shows a recorder according to still another illustrative embodiment, wherein times can be printed on the chart at positions spaced from reference graduations marked on the chart in the direction of feed. More specifically, the chart is fed rapidly up to a chart position corresponding to a time when the recording is to be started, and a time can be printed automatically according to the reference graduation on the chart. Identical or corresponding parts in FIGS. 13,14 are designated by identical or corresponding reference numbers or characters in FIGS. 1,2. Only those portions which are different from those in FIGS. 1,2 will be mainly described.

As shown in FIG. 13, the recorder comprises a chart 4, a chart feed means 32, a second sensor mechanism 326, a step counter 341, a clock 342, a step measuring means 343, and a control unit 344. Chart 4 has holes defined therein in certain positional relationship to reference graduation, for example, holes 41 aligned with primary lines 42 alternate with secondary lines 43.

Chart feed means 32 is responsive to a chart feed signal from control unit 344, to feed chart 4 in increments in the direction of arrow A.

Second sensor mechanism 326 comprises a sensor 3261 in the form of a photosensor. Sensor 3261 is positioned in alignment with a position in which the holes 41 pass. Second sensor mechanism 326 produces an ON/OFF signal dependent on the presence and absence of holes. An edge detector 3263 issues an edge signal when sensor 3261 detects the end or edge of a hole 41.

Step counter 341 is responsive to the chart feed signal from control unit 344 for incrementing the count each time chart 4 is fed one step. When an edge signal is received from edge detector 3263, the count is delivered to step measuring means 343, and step counter 341 is cleared.

Clock 342 generates a time dependent signal. Step measuring means 343 measures the number of chart feed steps required to feed chart 4 by an interval between adjacent primary lines 42. The number of steps thus measured is indicated by $x_{20}$.

Control unit 344 is comprised of an arithmetic means 3441 and a chart feed control 3442. Arithmetic means 3441 determines a chart feed interval to position chart 4 for the purpose of printing times based on signals from step counter 341, clock 342, and step measruring means 343. Chart feed control 3442 is responsive to a signal indicative of a chart feed interval from arithmetic means 3441 for controlling the feeding of chart 4.

The recorder thus constructed operates as follows. An example will now be described in which any adjacent pair of primary lines 42 are spaced 20 mm and chart 4 is fed at a speed 20 mm/h. FIG. 14 is a diagram illustrative of the manner in which chart 4 is positioned for the time printing. Identical portions in FIG. 14 are denoted by identical reference characters in FIG. 13.

Let the distance between the position of the tip of a recording pen and an adjacent primary line 42 be W mm at the time second sensor mechanism 326 detects the edge of hole 41, and the number of steps $x_s$ required for chart 4 to be fed by the distance W is given by $$x_s = x_{20} \times (W/20)$$

It is assumed that chart 4 is held at rest in a position C when the recorder is not in use. Step counter 341 is cleared each time it detects a hole end or edge, and is reset to zero in a position B before chart 4 is stopped in position C. The count of step counter 341 for position C is $x_p$.

The recorder is actuated to start feeding chart 4 at an actual time $t_p$. By rapidly feeding chart 4 from the primary line to position $x_{20} \times (t_p/60)$, expressed in terms of steps, or from the hole end or edge to position $x_{20} \times (t_p/60) + x_s$ in terms of steps, the time will be zero when the recording pen tip reaches the primary line. The interval of rapid feed of the chart thus effected is called "rapid feed interval for time matching".

Where actual time $t_p$ is ahead of the time corresponding to position C, that is, $x_{20} \times (t_p/60) + x_s > x_p$, the rapid feed interval for time matching is given in terms of the number of steps $x_F$ as follows:

$$x_F = x_{20} \times (t_p/60) + x_s - x_p$$

Where the actual time $t_p$ is behind the time corresponding to position C, that is, $x_{20} \times (t_p/60) + x_s < x_p$, the chart cannot be fed back, and will be fed to a position beyond the next primary line. The rapid feed interval for time matching at this time is given in terms of a number of steps $x_F$ as follows:

$$\begin{aligned}x_F &= x_{20} - \{x_p - (x_{20} \times (t_p/60) + x_s)\} \\ &= x_{20} \times (t_p/60 + 1) + x_s - x_p\end{aligned}$$

When the recording is to be resumed, a signal representing the above step number $x_F$ is fed from chart feed control 3442 to chart feed means 32 to enable the latter to feed chart 4 rapidly.

After the chart is thus positioned for printing a time, data are recorded on chart 4.

The feed intervals for time matching in the former and latter instances described above correspond respectively to $l_1$ and $l_2$, as shown in FIG. 14.

The recorder shown in FIG. 13 has the following advantages. Since the chart is positioned for time printing based on signals from control unit 344, step counter 341, clock 342, and step measuring means 343, the chart positioning for time printing can automatically be effected. For example, data and time at the time zero can automatically be printed on chart 4 on primary line 42.

Figure 15:
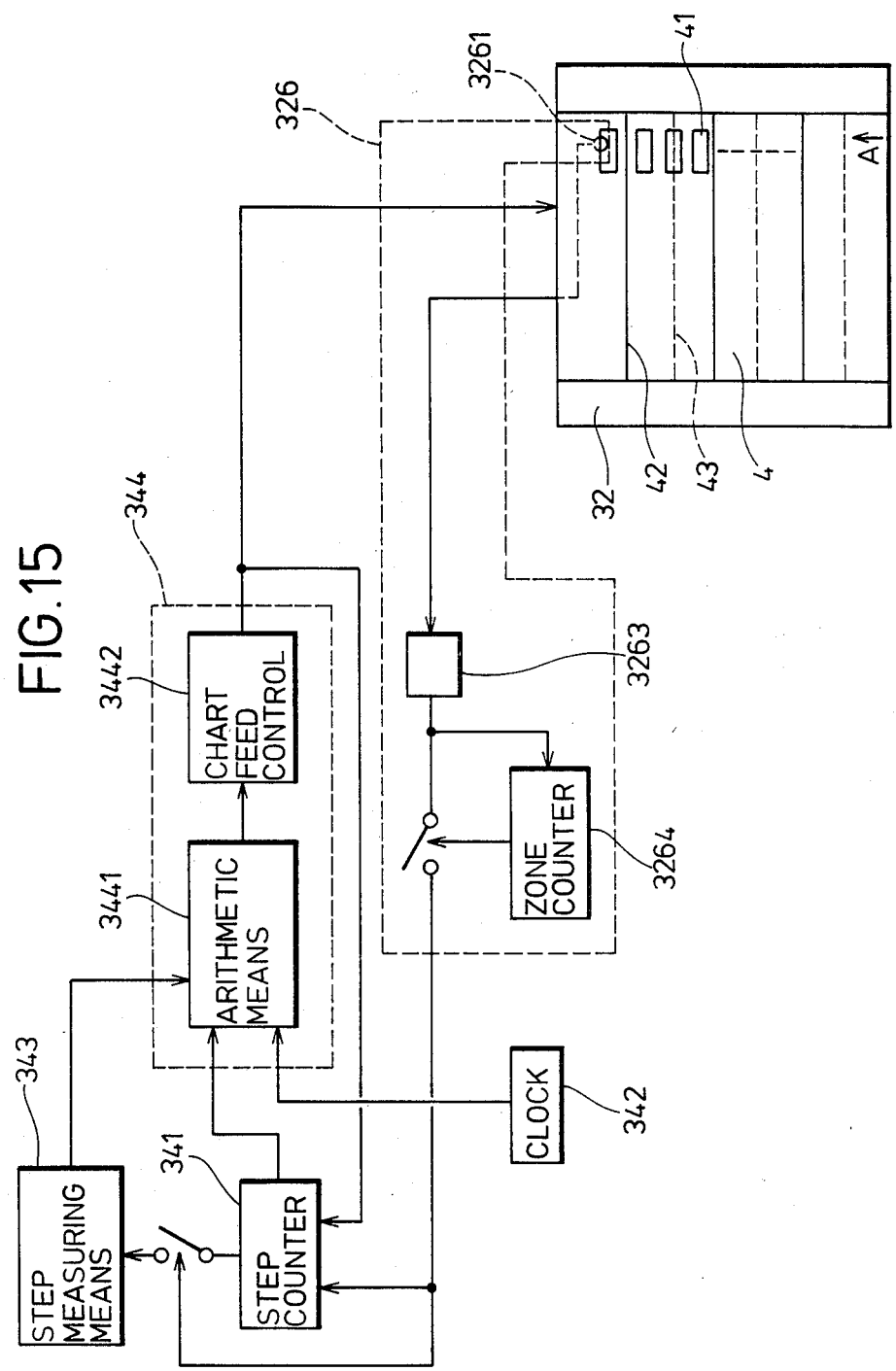
FIG. 15 is a block diagram depicting a modification of the embodiment of FIG. 13.

FIG. 15 illustrates in block form, a modification of the embodiment of FIG. 13. The modified recorder uses a standard chart having sprocket holes 41 which are engaged by sprocket teeth. There are a plurality, for example, three, of substantially equally spaced sprocket holes 41 defined between adjacent primary lines 42. Of course, additional sprocket holes may be formed between the adjacent primary lines.

Second sensor mechanism 326 includes a zone counter 3264 for incrementing the count each time photosensor 3261 detects a sprocket hole 41. Zone counter 3264 is forcibly cleared to zero when the count reaches 3. Thus, the zone counter 3264 repeats counting 0, 1, 2, 0, 1, 2, ...

Figure 16:
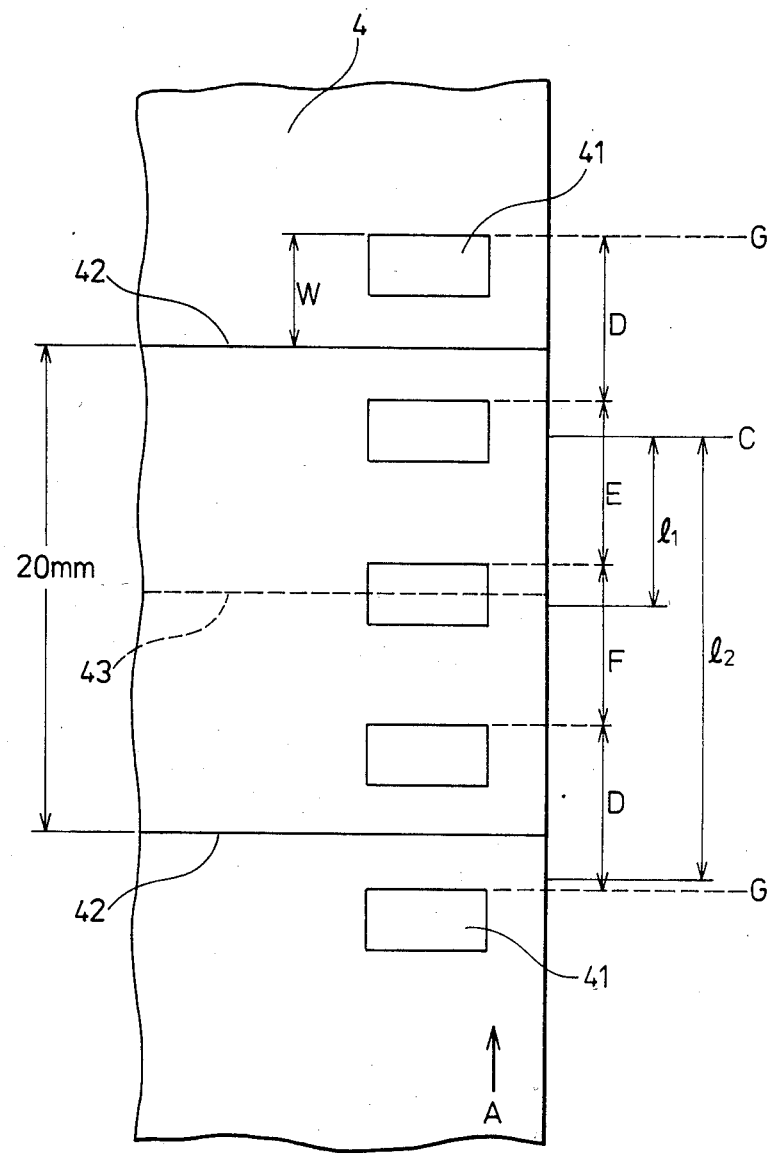
FIG. 16 is a diagram depicting operation of the embodiment of FIG. 15.

Operation of the recorder of FIG. 15 will now be described. The distance between any adjacent pair of primary lines and the speed of feeding of chart 4 are the same as those described with reference to FIG. 13. FIG. 16 is a diagram illustrative of the manner in which the chart 4 is positioned for printing time.

Chart 4 has three sprocket holes 41 between any pair of adjacent primary lines. Chart 4 is divided into a plurality of sections each comprising three zones D, E, F divided by sprocket holes 41. The chart is loaded by cutting off the chart end at one of the primary lines which serves as a fold line. At the chart end, zone counter 3264 is set to zero. Zone counter 3264 now ccounts zones D, E, F as 0, 1, 2, respectively. Only when the sensor 3261 detects the edge of a sprocket hole 41 at the time the count of the zone counter 3264 is 2 (in the position G), the count of the step counter 341 is delivered to step measuring means 343, and step counter 341 is cleared. Thus, the step counter 341 is cleared each time a primary line is passed.

The zone counter 3264 thus identifies a sprocket hole which is finally detected between adjacent primary lines.

With this recorder, chart 4 is stopped in position C when the recorder is not in use. Step counter 341 is set to zero when the edge of the hole in position G is identified by zone counter 3264 before chart 4 is stopped in position C.

After the time matching has been effected in the same manner as that of FIG. 14, data start to be recorded on chart 4.

The recorder of FIG. 15 has an additional advantage other than the advantages of the recorder shown in FIG. 13. More specifically, zone counter 3264 identifies a plurality of sprocket holes between adjacent primary lines and clears step counter 341 in each interval between adjacent primary lines. Therefore, the recorder can use a standard chart having a plurality of sprocket holes defined between adjacent primary lines.

Although in the modification of FIG. 15 the chart feed speed is 20 mm/h and the interval between adjacent primary lines is 20 mm, they may be of different values. Also, although time matching is effected at primary lines, it may be carried out at secondary lines. In addition, any desired time, instead of the time zero, may be printed on the primary line.

In the embodiment of FIG. 13, the holes 41 are formed on the primary lines 42. However, holes 41 may be formed in positions which are related in some ways to reference graduations.

With the above embodiment, therefore, there is provided a recorder which, advantageously, is capable of automatically positioning the chart for printing times thereon.

FIG. 17 is illustrative of a recorder according to a still further embodiment of the present invention. In this recorder, data are recorded on a chart with reference to reference graduations which are marked in the direction of feed of the chart and which are detected by a sensor, and errors in detection of the reference graduations by the sensor are corrected so that correct recording can be effected according to the reference graduations. Identical or corresponding parts in FIG. 17 are denoted by identical or corresponding reference characters in FIGS. 1, 2 and only those portions which differ from those of FIGS. 1, 2 will be described.

The depicted recorder has a chart 4, a chart feed roller or sprocket 322, a chart feed means 32, a second sensor mechanism 326, a memory 35, a recording position adjustment unit 35, and a recording head 5.

Chart 4 is fed along the direction of arrow A. Chart 4 has primary lines spaced at intervals in the direction of arrow A. An adjacent pair of primary lines are spaced 1 cm, for example, but may be spaced at different intervals. Chart 4 has holes 41 defined in and along longitudinal edges thereof. Each hole in each edge of chart 4 corresponds to one primary line. The sprocket 322 has teeth 3221 for engaging in holes 41. Chart 4 is wound around sprocket 322 with its teeth 3221 engaged in holes 41.

Chart feed means 32 comprises a stepping motor for rotating sprocket 322 about its own axis to feed chart 4 in the direction of arrow A.

Second sensor mechanism 326 comprises a photosensor, for example, positioned in alignment with holes 41 below the path of travel of chart 4, for example. Memory 35 has a data area for storing the number of steps required for feeding chart 4 by a distance 1 from the position of a hole 41 detected by second sensor mechanism 326.

Recording position adjustment unit 36 has a mode switching key 361, a recording position raising key 362, and a recording position lowering key 363. These keys are disposed in the recorder. Modes switching key 361 effects switching between a normal mode in which data are recorded in response to an input signal and a correction mode in which the chart position is corrected so that a recording position is aligned with a primary line under certain conditions. When recording position raising key 362 or recording position lowering key 363 is depressed in the correction mode if the recording position is deviated from the primary line position, chart 4 is fed along until the recording position is aligned with the primary line, and at the same time, the number of steps stored in memory 35 is varied dependent on the deviation.

Recording head 5 is moved in the directions of arrows J,J' in response to an input signal applied thereto and records data on chart 4 in the form of dots.

Operation of the recorder of FIG. 17 is as follows. In the correction mode, data are fed to chart feed means 32 so that recording will be effected on chart 4 substantially in the position of the primary line in an initial process, and recording head 5 starts recording data in the vicinity of the primary line.

At this time, recording head 5 records data on chart 5 alternately in the vicinity of 0% and 100%, e.g. 0.00%, 90.0%, 0.33%, 90.33%, for example. This is because any deviation at 0% and 100% recording positions can immediately be recognized when chart 4 is fed along obliquely.

After data are recorded in the 100% position on chart 4, chart 4 is fed 1 cm in the direction of arrow A. Then, data are recorded agin in the 0.00, 90.00, 0.33, 90.33% positions on chart 4.

When the recording position is one step below primary line 42, for example, due to an error of second sensor mechanism 326, that is, the recording position is at K, the original chart feed interval is insufficient. To correct this, recording position raising key 362 is depressed once to feed chart 4 one step, whereupon the number of steps stored in memory 35 is incremented by 1.

When the recording position is one step above primary line 42, for example, due to an error of second sensor mechanism 326, that is, the recording position is at L, the original chart feed interval is excessive. Since the chart 4 cannot be fed back in such a case, recording position lowering key 363 is depressed to feed chart 4 by a distance ( 1 cm - one step feed interval) to bring the recording position into alignment with a next primary line. Upon depressing recording position lowering key 363, the number of steps stored in memory 35 is decremented by 1.

Chart 4 can be set to a proper position in the above manner. Chart 4 can also be set to a proper position similarly when the recording position is deviated from the primary line by a different number of steps.

The recorder shown in FIG. 17 has the following advantages. Any deviation of the recording position from the primary line on chart 4 due to an error of the second sensor mechanism can be corrected by recording position adjustment unit 36. With the recording position thus corrected, data can accurately be recorded on the primary line under certain conditions such a fixed time, a recording starting time, and the like.

While in the illustrated embodiment of FIG. 17, second sensor mechanism 326 is disposed below the path of travel of chart 4, second sensor mechanism 326 may be located in other positions aligned with holes 41, for example, above the path of travel of chart 4.

In the above embodiment, each of the holes on each chart edge corresponds to one of the primary lines 42. However, where memory 35 contains more data areas for storing the number of steps of the distance from the hole to the primary line, the recorder can employ a chart such as a standard chart which has a plurality of holes defined therein between adjacent primary lines.

While in the foregoing embodiment, chart feed roller 322 is in the form of a sprocket for feeding chart 4 with teeth 3221, chart feed roller 322 may comprise another type of roller, such as a friction roller for frictionally feeding chart 4.

The chart can be fed one step by actuating once the recording position raising key 362 or the recording position lowering key 363. However, the recording position raising key 362 and the recording position lowering key 363 may be arranged to feed the chart 4 several steps each time the key is actuated once.

With the above arrangement, the recorder can record data accurately in the position of a primary line under given conditions.

The foregoing description is illustrative of the principles of the invention. Numerous modifications and extensions thereof would be apparent to the worker skilled in the art. All such modifications and extensions are to be considered to be within the spirit and scope of the invention.

What is claimed is:

1. A recorder comprising, in combination,
    a case;
    a chart feed mechanism mounted in said case for feeding in incremental steps a chart having substantially equally spaced holes defined in at least one longitudinal edge thereof;
    a recording head mounted in said case and movable in a direction substantially perpendicular to the direction of travel of said chart for recording data on said chart; wherein
    said chart feed mechanism comprises a chart stock disposed in said case for storing said chart therein, said chart stock having a chart outlet; chart feed means having a discharge roller for discharging said chart from said chart stock, first presser means for pressing said chart against said discharge roller, a feed roller for feeding discharged chart, and second presser means for pressing said chart against said feed roller; a first sensor mechanism disposed in said case in confronting relation to said chart outlet for detecting whether said chart is present in said outlet and for applying a drive signal to said chart feed means when said chart is in said outlet; and a second sensor mechanism disposed in said case in confronting relation to said chart and positioned in a path of travel of said chart between said discharge roller and said feed roller, said second sensor mechanism being arranged to detect whether said chart is in said path a fixed period of time after said chart feed means has started being driven by said drive signal from said first sensor mechanism, to keep said chart feed means driven for a certain period of time when the chart is in the said path, and to apply a signal to inactivate said chart feed means when said chart is not present in said path.

2. The recorder of claim 1, wherein said chart is fed at a greater rate by said feed roller than by said discharge roller, and wherein said feed roller and said discharge roller impose different frictional forces on said chart, one of said different frictional forces being greater than the other.

3. The recorder according to claim 1, wherein said first presser means comprises a guide plate comprising one end angularly movably mounted on said chart stock at said chart outlet and an opposite end held against said discharge roller with said chart positionable therebetween; pusher means mounted on said chart stock adjacent to said chart outlet; and a leaf spring comprising an intermediate portion angularly movably supported on said case, one end pressed by said pusher means, and an opposite end pressed against said opposite end of said guide plate.

4. The recorder of claim 1, wherein said chart stock comprises a magnetic body, and said case comprises a magnet mounted therein in confronting relation to said magnetic body of said chart stock for magnetically attracting said magnetic body.

5. The recorder of claim 1, wherein said first presser means comprises a guide plate mounted on said chart stock at said chart outlet and having one end held against said discharge roller with said chart positionable therebetween, a cover covering an opening in said chart stock, and a brush mounted on one end of said cover and cooperating with said guide plate in positioning said chart, thereby to feed said chart only in a direction to be discharged out of said chart stock.

6. The recorder of claim 1, wherein said second sensor mechanism is positioned in confronting relation to said holes in said chart for generating an electrical signal indicative of said holes; and wherein further comprising counter means for counting incremental steps of feed of said chart by said chart feed mechanism between edges of adjacent holes, feed interval calculating means for calculating a feed interval corresponding to an interval between recorded dots from number of said incremental steps, time calcualting means for calculating a period of time in which each hole edge passes based on said number of incremental steps, a control unit for comparing calculated period of time with a period of time based on a clock which has started at the same time that said chart starts being fed, and for effecting a PI control mode so that difference between compared times will be eliminated, correcting means for correcting feed interval issued as an output from said feed interval calculating means with an output from said control unit, and a chart feed control for driving said chart feed mechanism by incremental steps indicated by an output from said correcting means.

7. The recorder of claim 1, wherein said holes in said chart are formed in positional relationship to reference graduations; said chart feed means feeding said chart in incremental steps; said second sensor mechanism being positioned in alignment with said holes for detecting said holes; and wherein further comprising a step counter for counting an incremental step of feeding of said chart each time said chart is fed one incremental step, said step counter being cleared when said second sensor mechanism detects an edge of a hole, a clock for generating a time dependent signal, step measuring means for measuring a number of incremental steps required to feed said chart at an interval between reference graduations, and a control unit responsive to signals from said step counter, said clock, and said step measuring means for comparing a current time and position of said chart and feeding said chart an interval before recording is started so that a time will be printed on said chart in a position spaced from a reference graduation.

8. The recorder of claim 1, wherein said chart has primary lines spaced in a direction of feed of said chart; said chart feed means comprising a feed roller around which said chart is wound, and means for rotating said feed roller to feed said roller in incremental steps, said second sensor mechanism being positioned in alignment with said holes for detecting said holes; and wherein further comprising a memory for storing a number of incremental steps required to feed said chart a distance from position of a primary line on said chart to position of a hole detected by said second sensor mechanism; and a recording position adjustment unit operable in a correction mode for applying signal to effect recording on said primary line to said rotating means, for enabling said rotating means when a recording position is deviated from said primary line to feed said chart until said recording position is aligned with said primary line, and for varying number of steps stored in said memory according to deviation of said recording position from said primary line.

* * * * *